Figure 1:
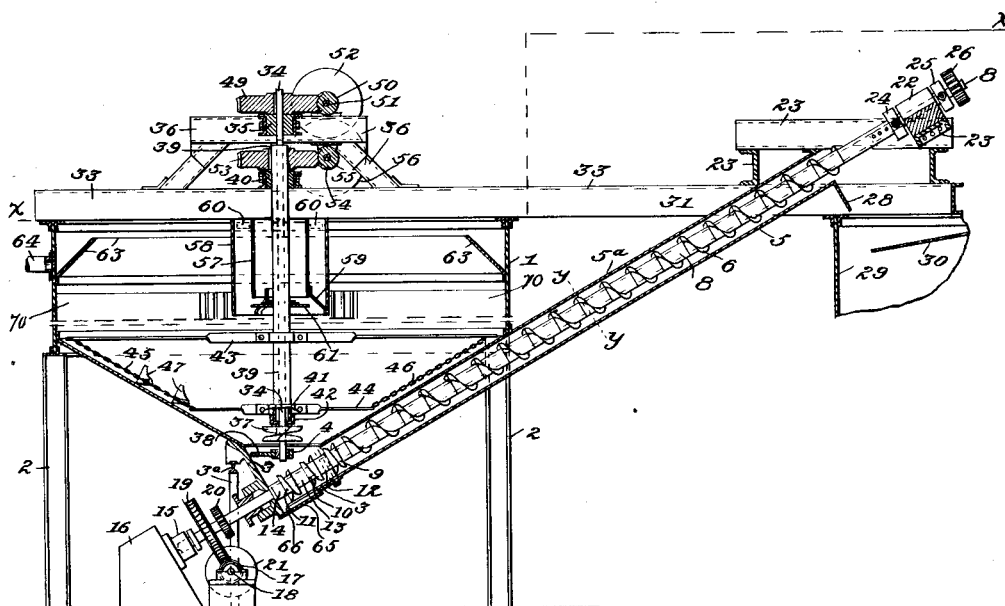

W. A. HENDRYX.
DEWATERING DEVICE OR MEANS FOR SEPARATING SOLIDS AND LIQUIDS.
APPLICATION FILED JULY 29, 1912.

1,071,917.

Patented Sept. 2, 1913.

Witnesses:

Inventor:
Wilbur A. Hendryx,
by Byrnes, Townsend & Brickenstein,
Att'ys.

UNITED STATES PATENT OFFICE.

WILBUR ALSON HENDRYX, OF NEW YORK, N. Y.

DEWATERING DEVICE OR MEANS FOR SEPARATING SOLIDS AND LIQUIDS.

1,071,917.  Specification of Letters Patent.  Patented Sept. 2, 1913.

Application filed July 29, 1912. Serial No. 712,172.

*To all whom it may concern:*

Be it known that I, WILBUR A. HENDRYX, a citizen of the United States, residing at New York, in the county of New York and State of New York, have invented certain new and useful Improvements in Dewatering Devices or Means for Separating Solids and Liquids, of which the following is a specification.

My present invention appertains to a dewatering device primarily designed for removing water or solutions from pulverized ore. It may, however, be used for separating other solids and liquids.

The invention relates particularly to that type of dewatering device in which a settling vessel is employed and one or more inclined screws are utilized for removing the solid matter from the bottom of said settling vessel.

According to my invention I employ two screws, or a multiple of two, arranged in pairs, each pair being arranged to operate or work in a single and common trough or casing, that is to say without any dividing wall or partition between them, the casing for the whole or any suitable portion of its length being in direct communication with the interior of the settling vessel. The screws of each pair are revolved in opposite directions by suitable driving means either from the top or the bottom, or from both top and bottom of the screws. The threads of the screws approach each other edge on, and do not intermesh with each other; the edge-on arrangement provides a more effective propelling means for slimes, etc., of this character than intermeshing threads, there being no tendency for the pulp to be pushed over into the hollow of the other screw; the threads may be either continuous or intermittent for the whole or any desired portion of their length and be either single or double or a combination thereof.

The discharge of the solids from the casing or trough or casings or troughs may take place either at the top or the bottom thereof or in any intermediate position or positions by providing a suitable outlet or outlets for that purpose; means preferably being provided for completely or partially closing any or all of said outlets. The discharge of the solids at or near the top of the trough or casing or at any point intermediate the top and bottom thereof is effected by rotating means driving the screws in one direction, while the discharge of said solids at the bottom of the trough or casing is effected by rotating said driving means in the opposite direction. If it be desired to provide for the discharge of the material at either top or bottom of the trough then convenient means will be provided for driving the screws in either direction.

With the above described arrangement I preferably combine means for feeding or delivering the solids which settle in the bottom of the vessel into the trough or casing or troughs or casings of the inclined screw conveyers. Such means may conveniently take the form of a vertical shaft provided with arms spirally disposed around said shaft, or be in the form of a continuous or intermittent parallel or tapered screw arranged above the inlet into the trough or casing, which screw may be continued in an upward direction for any suitable portion of the length of the shaft. On the aforesaid shaft or (and preferably) upon a sleeve surrounding said shaft I provide one or more sets of radial arms and connect the outer ends of the various sets of said arms by chains or other similar preferably flexible devices. The chains or like flexible devices will move in close proximity to the preferably inclined bottom of the settling vessel and they preferably have attached to them contrivances similar to plow shares, or the disks of a disk plow, the plow shares or disks and chains operating to prevent accumulation of the solids upon the inclined bottom of the vessel and to move the same in the direction of the outlet. The screw which operates to force the settled material through the outlet into the casing or trough of the inclined screw conveyers, and the arms, chains and plow shares are preferably driven or operated by different driving means, the latter being preferably so designed that the feeding screw can be driven at a higher speed than the arms, chains and plow shares or their equivalent.

The pulp or mixtures of solids and liquids is delivered into the top of the settling vessel preferably through a suitable vertical inlet pipe which latter is preferably provided with a baffle concentrically disposed around it and with a horizontal baffle plate to prevent undue agitation or disturbance of the contents of the vessel by the inflowing pulp stream.

The vessel is provided at the top with an overflow rim launder which may be arranged either internally or externally as preferred.

The invention will be more fully described with the aid of the accompanying drawing wherein—

Figure 3:
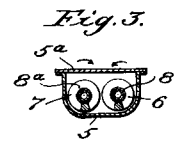
Figure 2:
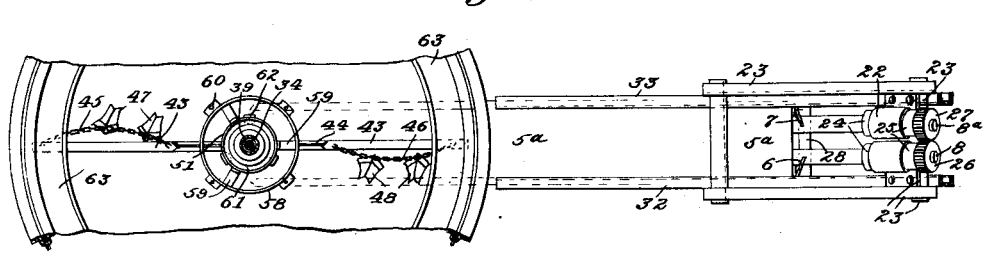

Figure 1 represents the dewatering device in sectional elevation; Fig. 2 being a plan of Fig. 1 on line x—x; and Fig. 3 is a transverse section of the conveyer casing or trough on line y—y of Fig. 1.

In the drawings, 1 designates the settling vessel shown consisting of an upper cylindrical portion and a lower inverted truncated conical portion.

2 represents members which support the vessel 1.

3 is a casting fixed around the outlet 4 in the bottom of the conical vessel 1 and carried by support 3ª, this casting forming a continuation of the settling vessel 1.

5 is the single or common casing for the two screw conveyers 6, 7, which as shown (see more particularly Fig. 3) are arranged parallel to each other and have no dividing wall or partition between them. The screws are shown (see Fig. 1) consisting of single pitch segments having a hollow center whereby they are fixed upon hollow shafts 8, 8ª. The lower portions of each of the conveyer screws are shown consisting of double-threaded segments 9, 10, 11 spaced apart by means of distance pieces 12, 13, 14 and fixed upon the hollow shafts 8, 8ª in a similar manner to the segments of the screws 6, 7. The solid lower ends of the shafts 8, 8ª pass through stuffing-boxes and glands provided for them in the casting 3 and run in footstep bearings 15 at their extremities; 16 being a support for the said footstep bearings. The screws 6, 7 are driven from the bottom by means of a worm 17 on a shaft 18, the worm 17 engaging a worm wheel 19 on one of the screw shafts.

20 is a spur wheel on the one screw shaft which meshes with a corresponding spur wheel on the other shaft and transmits motion thereto, the screws being both rotated inwardly in opposite directions as indicated by the arrows in Fig. 3.

21 is a pulley for driving a worm shaft 18.

The solid upper portions of the shafts 8, 8ª run in bearings 22 carried by the framework or structure 23, 24, 25 representing collars on the shafts above and below said bearings.

26, 27 (see Fig. 2) are meshing spur wheels fixed upon the upper ends of the shafts 6, 7 for insuring synchronous movement of the two screw conveyers. The casing at the top is shown provided with a lip 28 by which the solid matter conveyed up the trough or casing by the screws is delivered into an agitating or other vessel 29. The solids instead of being delivered into a further vessel may be delivered onto a conveyer belt or into trucks or other vehicles for transporting them to any desired place.

30 represents a baffle in the upper portion of the agitating vessel 29.

The upper end of the casing 5 may be secured as indicated at 31 to the girders 32, 33 (see Fig. 2) which extend across the top of the vessels 1 and 29.

34 is the central vertical shaft of the feeding screw, 35 being a guide bearing for the upper end thereof, said guide bearing being carried by the built up structure 36. The lower end of shaft 34 runs in a guide bearing, and around it in said bearing is preferably provided a ring of rubber or other suitable resilient material. The feed screw 37 on the shaft 34 is shown comprising a double thread of a length equal to about half its pitch. The feeding screw may comprise any number of such segments, or it may be in the form of a continuous single or double screw of any desired length. The spaces between the spider arms 38 carrying the bottom guide bearing for the feed screw shaft 34 provide the passages for the solids to pass into the conveyer casing 5. The conveyer casing 5 (see Fig. 3) is provided with a removable cover 5ª. Any part of the bottom of the settling vessel above the conveyer screws 6, 7 or the segments 9, 10, 11 may be cut away to directly expose any desired portion of said screws 6, 7 to the interior of the vessel 1.

39 is the hollow shaft arranged around shaft 34. It is provided with a guide bearing 40 at the top which is carried by the beams 32, 33 and has a bearing around the shaft 34 provided by a cylindrical piece of wood or other suitable material 41 placed between it and the shaft and a cap or socket 42 screwed or otherwise fixed over its lower end to retain said piece of wood in position.

43, 44 are arms clamped around the hollow shaft 39 at a suitable distance apart, and 45, 46 are chains connecting the outer ends of said arms. The chains as shown move in contact with or in close proximity to the inclined bottom of the vessel 1.

47, 48 are the plow shares fixed to the chains or like flexible connections 45, 46. The plow shares and chains as previously explained prevent accumulation of the solids in the bottom of the vessel and move the solids in the direction of the outlet 4. The plow shares 47 or their equivalent may be attached to either or both of the arms 43, 44 instead of to the chains.

49 is a worm wheel on the upper end of the feed screw shaft 34, and 50 a worm engaging said worm wheel, 51 being the shaft of worm 50, and 52 the pulley for imparting rotary motion to shaft 51.

53 is a worm wheel on the concentric tubular shaft 39; 54 the worm engaging the worm wheel 53; 55 the shaft of worm 54, and 56 the pulley or gear wheel for driving said shaft. By this means the feed screw 37 which operates to deliver the settled solids through the opening 4 into the trough or conveyer casing can be driven at a different speed to that at which shaft 39 is rotated.

57 is the inlet pipe for the pulp stream, 58 the concentric cylindrical baffle arranged around and fixed to the inlet pipe 57 by means of the bracket 59.

60 are brackets for fixing the cylindrical baffle 58 to the girders 32, 33 by which means the inlet pipe 57 and concentric baffle 58 are supported in position inside the vessel 1.

61 is a flat circular baffle plate arranged at a suitable distance beneath the inlet pipe 57; 62 representing brackets for supporting it from said pipe.

63 is the overflow internal rim launder, and 64 the overflow outlet.

65 in Fig. 1 represents a door closing an opening 66 in the bottom of the casting 3 to provide for access to the interior of the latter or for discharging the settled material at that point if desired. In the latter case the screws 6, 7 will be rotated in the opposite directions to those which they are rotated to convey the material up the casing 5. It will be evident that the inclination of the bottom of the settling vessel 1 and the inclination of the trough or casing 5 for the screw conveyers 6, 7 can be varied as may be required.

The operation of the device will be apparent from the foregoing detailed description. It may, however, be briefly described as follows: The pulp stream enters the inlet pipe 57. The baffles 61, 58 prevent the inflowing stream unduly agitating the contents of the vessel 1. The solid component of the mixture settles in the bottom of the vessel and is moved in the direction of the outlet 4 by the chains 45, 46 and plow shares 47, 48. The solids are then forced through the outlet 4 into the interior of the casting 3 and the screw segments 9, 10, 11 on the two shafts 8, 8* deliver the same into the lower end of the casing 5, whereupon the screws 6, 7 convey such solids up the casing or trough 5 and ultimately deliver them into the vessel 29. The liquid portion of the mixture enters the overflow launder 63 from which it escapes through the outlet pipe 64. In the upper portion of the tank, there may be arranged, if desired, a series of radially-disposed filter-cells 70, preferably in the manner shown in my prior Patent No. 960,546, patented June 7, 1910.

What I claim is:

1. A dewatering apparatus comprising a tank having a lower converging portion, an upwardly extending undivided conduit directly connected to the bottom of said lower portion and a pair of oppositely rotating screws located in such conduit, said screws having their edges approaching each other and the sides of the conduit.

2. A dewatering apparatus comprising a settling tank having arranged near its bottom rotatable propeller blades, in combination with an upwardly-extending conveyer chute extending into the bottom of said tank, screw conveyers in said chute, said chute having an opening at its bottom, and a gate for controlling the opening, and means for rotating said conveyers in either direction.

3. A dewatering apparatus comprising, in combination, a settling vessel, a pair of oppositely rotatable screws arranged in an upwardly inclined trough or casing, the said trough or casing extending into the bottom of the settling vessel, the lower portions of each of said screws comprising double-threaded sections spaced apart, and of less pitch than the main screw.

4. A dewatering apparatus comprising, in combination, a settling vessel, a pair of oppositely rotatable screws arranged in an upwardly inclined trough or casing, the said trough or casing extending into the bottom of the settling vessel, the lower portions of each of said screws comprising double-threaded sections spaced apart and of less pitch than the main screw, and a door located in the bottom of said trough at its lower end.

5. A dewatering device comprising a settling tank having a conical lower portion and having arranged near its bottom rotatable propeller blades, in combination with means for preventing accumulation of the settled material inside the conical portion of the settling vessel comprising rotatable arms, connecting means between said arms, said means being provided with plow shares.

In testimony whereof I affix my signature in presence of two witnesses.

WILBUR ALSON HENDRYX.

Witnesses:
E. N. GUNSAULUS,
L. F. HELLIER.